(No Model.)
H. G. TILLINGHAST.
SOIL OR OTHER PIPE PLUG.
No. 521,835. Patented June 26, 1894.
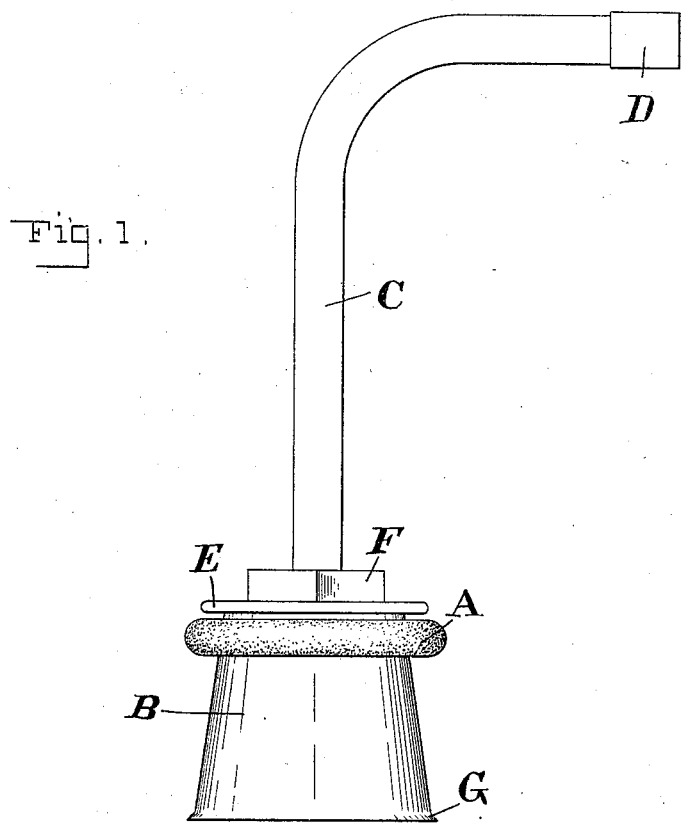
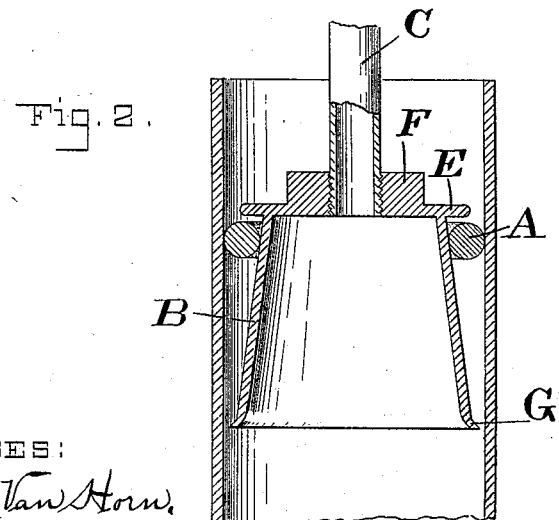
WITNESSES:
L. Ismy Van Horn,
Chas. B. Mann Jr.
INVENTOR:
H. G. Tillinghast
By
Chas. B. Mann
ATTORNEY

UNITED STATES PATENT OFFICE.

HENRY G. TILLINGHAST, OF BALTIMORE, MARYLAND.

SOIL OR OTHER PIPE PLUG.

SPECIFICATION forming part of Letters Patent No. 521,835, dated June 26, 1894.

Application filed September 15, 1893. Serial No. 485,632. (No model.)

*To all whom it may concern:*

Be it known that I, HENRY G. TILLINGHAST, a citizen of the United States, residing at Baltimore, in the State of Maryland, have invented certain new and useful Improvements in Expansible Plugs for Testing Soil-Pipes or other Pipes, of which the following is a specification.

This invention relates to certain improvements in expansible plugs for closing the ends of pipes to facilitate the operation of testing them with reference to their tightness.

The invention is illustrated in the accompanying drawings, in which—

Figure 1 is a side view of the expansible plug. Fig. 2 is a section of the same showing it applied to the end of a pipe.

The letter, B, designates a cone-shaped plug provided at its small end with a flange or collar, E, which, being larger than said small end, projects circumferentially; the large end of this plug has a bell-shaped rim-flange, G, which flares off or expands beyond the plane of the sides of the cone-plug. A square nut-head, F, at the small end is cast integral with the cone part. A pipe, C, has its end threaded and is screwed into the nut-head; this pipe has a laterally-curved or bent end which is also screw-threaded to receive a cap, D, or to make connection with any air-forcing apparatus, or with a water-supply pipe. A ring, A, of rubber is placed around the cone-plug, B, and normally is smaller than the flange, E, at the small end,—this flange, therefore, keeps the ring from coming off, and when the plug is being placed in the end of a pipe the flange, E, serves a useful purpose in holding the rubber ring and forcing it to enter the pipe-end. The outer diameter of the ring, A, is larger than the greatest diameter of the cone-plug.

In operation the device is used as follows: The laterally-curved end of the pipe, C, serves as a grasp, and the large end of the cone-plug is inserted in the end of the pipe to be tested, and the rubber ring, A, also is inserted as the flange, E, back of the ring keeps the latter from coming off the small end of the plug, which it commonly does at the time of inserting the plug in those cases where the plug has no flange; it is essential to keep the ring on the cone-part of the plug when inserting it so as to insure that the ring will act as a packing between the plug and the inner wall of the pipe. Now when the plug and ring have been inserted far enough into the pipe-end to allow for a slight backward movement without the ring coming out, the device is in readiness for the air-pressure, or the water-pressure, whichever may be employed. The fluid-pressure now being passed through the pipe, C, and plug into the pipe that is being tested will cause a pressure in this pipe, which pressure will act on the plug, B, and force it backward and cause it to move in or partly through the ring, A, thus as it moves bringing a larger part of the plug to bear on the ring, which latter will not move; in this way the rubber ring will become wedged tight between the cone-plug and the inner wall of the pipe under test. In case the pipe that is being tested is relatively larger than the cone-plug, indicated in the drawings, the bell-shaped rim-flange, G, will serve to stop the backward movement of the plug, B, by said flange coming against the rubber ring. To withdraw the plug from the pipe, the pressure is first removed, then by pushing on the handle pipe, C, the plug is forced inward and moved through the ring, A, until the collar, E, comes in contact with the ring; a screw motion may now be given the plug which will cause the whole device to be released.

Having thus described my invention, what I claim as new, and desire to secure by Letters Patent, is—

The combination of the cone-shaped plug having a flange or collar, E, at its small end which is larger than and projects circumferentially beyond said small end, and a bell-shaped flange at the other end; a ring of rubber packing around said plug which is of relatively smaller size than the said flange or collar; and a pipe, C, connected with the cone-plug and having a lateral curve which serves as a hand-grasp, whereby when the cone-plug is inserted large end first in a pipe to be tested, the said flange or collar prevents the rubber ring from coming off the cone-plug.

H. G. TILLINGHAST.

Witnesses:
C. H. ELLYSON,
W. F. HEATH.